United States Patent
Magaribuchi et al.

(10) Patent No.: US 10,590,964 B2
(45) Date of Patent: Mar. 17, 2020

(54) ROTARY ACTUATOR

(71) Applicant: SMC CORPORATION, Chiyoda-ku (JP)

(72) Inventors: Mitsunori Magaribuchi, Moriya (JP); Takaaki Kobayashi, Higashiyamato (JP)

(73) Assignee: SMC CORPORATION, Chiyoda-ku (JP)

( * ) Notice: Subject to any disclaimer, the term of this patent is extended or adjusted under 35 U.S.C. 154(b) by 5 days.

(21) Appl. No.: 15/572,816

(22) PCT Filed: Mar. 14, 2016

(86) PCT No.: PCT/JP2016/057898
§ 371 (c)(1),
(2) Date: Nov. 9, 2017

(87) PCT Pub. No.: WO2016/181700
PCT Pub. Date: Nov. 17, 2016

(65) Prior Publication Data
US 2018/0087544 A1    Mar. 29, 2018

(30) Foreign Application Priority Data

May 11, 2015 (JP) ................................. 2015-096588

(51) Int. Cl.
*F15B 15/06* (2006.01)
*F15B 15/28* (2006.01)
(Continued)

(52) U.S. Cl.
CPC ........ *F15B 15/065* (2013.01); *F15B 15/2861* (2013.01); *F16H 19/04* (2013.01);
(Continued)

(58) Field of Classification Search
CPC .... F15B 15/065; F15B 15/1419; F16H 19/04; F16H 19/043
(Continued)

(56) References Cited

U.S. PATENT DOCUMENTS 2,844,127 A * 7/1958 Steiner .................. F15B 15/065
92/68
3,156,160 A * 11/1964 Meyer .................. F15B 15/065
92/13.6
(Continued)

FOREIGN PATENT DOCUMENTS

EP    0 663 261 A1    7/1995
JP    2002-130208 A    5/2002
(Continued)

OTHER PUBLICATIONS

International Search Report dated Jun. 14, 2016 in PCT/JP2016/057898 filed Mar. 14, 2016.
(Continued)

*Primary Examiner* — Michael Leslie
*Assistant Examiner* — Dustin T Nguyen
(74) *Attorney, Agent, or Firm* — Oblon, McClelland, Maier & Neustadt, L.L.P.

(57) ABSTRACT

A rotary actuator (10) is provided with a linear activation mechanism (40*a*) that causes a pinion (80) to rotate, and a cylinder body (12) in which a cylinder hole (28*a*) is formed. The linear activation mechanism (40*a*) comprises a rack (42) on which a plurality of teeth (44) that mesh with the pinion (80) are provided, and pistons (48*a*, 48*b*). The pistons (48*a*, 48*b*) are each provided with a piston main body (50*a*, 50*b*) that has a shape corresponding to that of the cylinder hole (28*a*). Each of the piston main bodies (50*a*, 50*b*) comprises a body (52*a*, 52*b*) and an extension section (54*a*, 54*b*). The ends of the rack (42) are connected to the extension sections
(Continued)

(54a, 54b) of the set of pistons (48a, 48b), and a space (73a) shielded from the cylinder hole (28a) is formed between the bodies (52a, 52b) of the set of pistons (48a, 48b). The linear activation mechanism (40b) is also configured similarly.

7 Claims, 7 Drawing Sheets

(51) Int. Cl.
  *F16H 19/04* (2006.01)
  *F15B 15/14* (2006.01)
  *F15B 15/24* (2006.01)
(52) U.S. Cl.
  CPC .......... *F15B 15/1419* (2013.01); *F15B 15/24* (2013.01); *F15B 15/2807* (2013.01)
(58) Field of Classification Search
  USPC ..................................................... 92/68, 136
  See application file for complete search history.

(56) References Cited

U.S. PATENT DOCUMENTS

| | | | | |
|---|---|---|---|---|
| 3,288,035 A * | 11/1966 | Ryzner | ................. | F15B 15/065 91/467 |
| 3,338,140 A * | 8/1967 | Sheesley | ............... | F15B 15/065 92/5 R |
| 5,024,116 A * | 6/1991 | Kraft | ..................... | F15B 15/065 74/109 |
| 5,076,090 A * | 12/1991 | Cetnarowski | ........ | B21D 28/002 269/227 |
| 5,189,923 A * | 3/1993 | Lashbrook | ............ | F15B 15/065 74/409 |
| 5,427,012 A * | 6/1995 | Frigon | ................... | B60S 1/481 91/459 |
| 5,560,282 A | 10/1996 | Trenner et al. | | |
| 6,547,258 B2 * | 4/2003 | Mandokoro | .............. | B25B 1/18 269/101 |
| 6,640,689 B2 * | 11/2003 | Mitsui | .................. | F15B 13/081 92/136 |
| 7,100,493 B2 * | 9/2006 | Nomura | ................ | F15B 15/065 92/130 R |
| 8,347,779 B2 * | 1/2013 | Miyazawa | ........... | F15B 15/065 92/136 |
| 8,646,376 B2 * | 2/2014 | Takeuchi | .............. | F15B 15/065 92/136 |
| 9,388,833 B2 * | 7/2016 | Zajac, Jr. | ............ | F15B 15/1419 |
| 2010/0018387 A1 | 1/2010 | Miyazawa | | |
| 2013/0269517 A1* | 10/2013 | Zajac, Jr. | ............ | F15B 15/1419 92/177 |

FOREIGN PATENT DOCUMENTS

| | | |
|---|---|---|
| JP | 2008-157289 A | 7/2008 |
| JP | 2010-266054 A | 11/2010 |
| TW | 201026963 A1 | 7/2010 |

OTHER PUBLICATIONS

Extended European Search Report dated Nov. 6, 2018 in European Patent Application No. 16792425.7, 7 pages.
Office Action dated Jan. 17, 2019 in the corresponding Korean Application No. 10-2017-7035587 with Unedited Computer-Generated English Translation, 8 pages.
Taiwanese Office Action and Search Report dated May 23, 2019, in Patent Application No. 105109823, 7 pages (with English translation).

* cited by examiner

ROTARY ACTUATOR

TECHNICAL FIELD

The present invention relates to a rotary actuator. In more detail, the present invention relates to a rotary actuator that can turn a workpiece or a table under an action of a pinion that enmeshes with a rack by supplying and discharging a fluid and causing a piston attached to the rack to perform a reciprocating operation.

BACKGROUND ART

Japanese Laid-Open Patent Publication No. 2008-157289 (referred to as Patent Document 1 below) discloses a technical idea of a rotary actuator of this type. An object of the invention disclosed in this Patent Document 1 is to realize a thin rotary actuator. However, according to a specific configuration of this invention, a pressure receiving surface that receives a fluid to actuate a piston has a substantially circular shape. Therefore, the rotary actuator cannot be formed thinly so much.

SUMMARY OF INVENTION

A main object of the present invention is to provide a rotary actuator that is small and thin compared to the conventional technique.

According to one embodiment of the present invention, the present invention is a rotary actuator, and includes: a linear actuating mechanism configured to cause a pinion to perform a rotating operation; and a cylinder body in which a cylinder hole is formed, the linear actuating mechanism being displaceably arranged therein, wherein the linear actuating mechanism includes a rack including a plurality of teeth configured to enmesh with the pinion, and a piston provided for the rack, the piston including a piston main body having a shape corresponding to the cylinder hole, and a sealing member attached to the piston main body, and the piston main body including a body, and an extended portion extending from the body toward the pinion, and wherein both end portions of the rack are coupled to parts of the extended portions of a pair of the pistons, the parts being deviated toward the pinion, and a space is formed between the bodies of the pair of pistons and is shielded from the cylinder hole.

According to the present invention, the bodies and the extended portions secure a sufficient pressure receiving area, so that it is possible to sufficiently secure a necessary thrust for a rack displacing operation. Further, the space shielded from the cylinder hole is formed between the pair of pistons, so that it is possible to use this space to arrange members such as piston position detection magnets or a wear ring. Consequently, it is possible to provide an effect of realizing the small and thin rotary actuator.

DESCRIPTION OF EMBODIMENTS

Preferred embodiments of a rotary actuator according to the present invention will be described in detail with reference to the accompanying drawings.

The rotary actuator according to the first embodiment of the present invention includes a pair of linear actuating mechanisms in parallel inside a cylinder body as described in detail below. Each linear actuating mechanism includes a pair of pistons, and a rack that is displaced by a reciprocating operation of the pistons. Further, the rotary actuator includes a pinion that is turned by a reciprocating operation of the rack. A rotating operation of the pinion is configured to, for example, rotate a table arranged outside the cylinder body.

Figure 1:
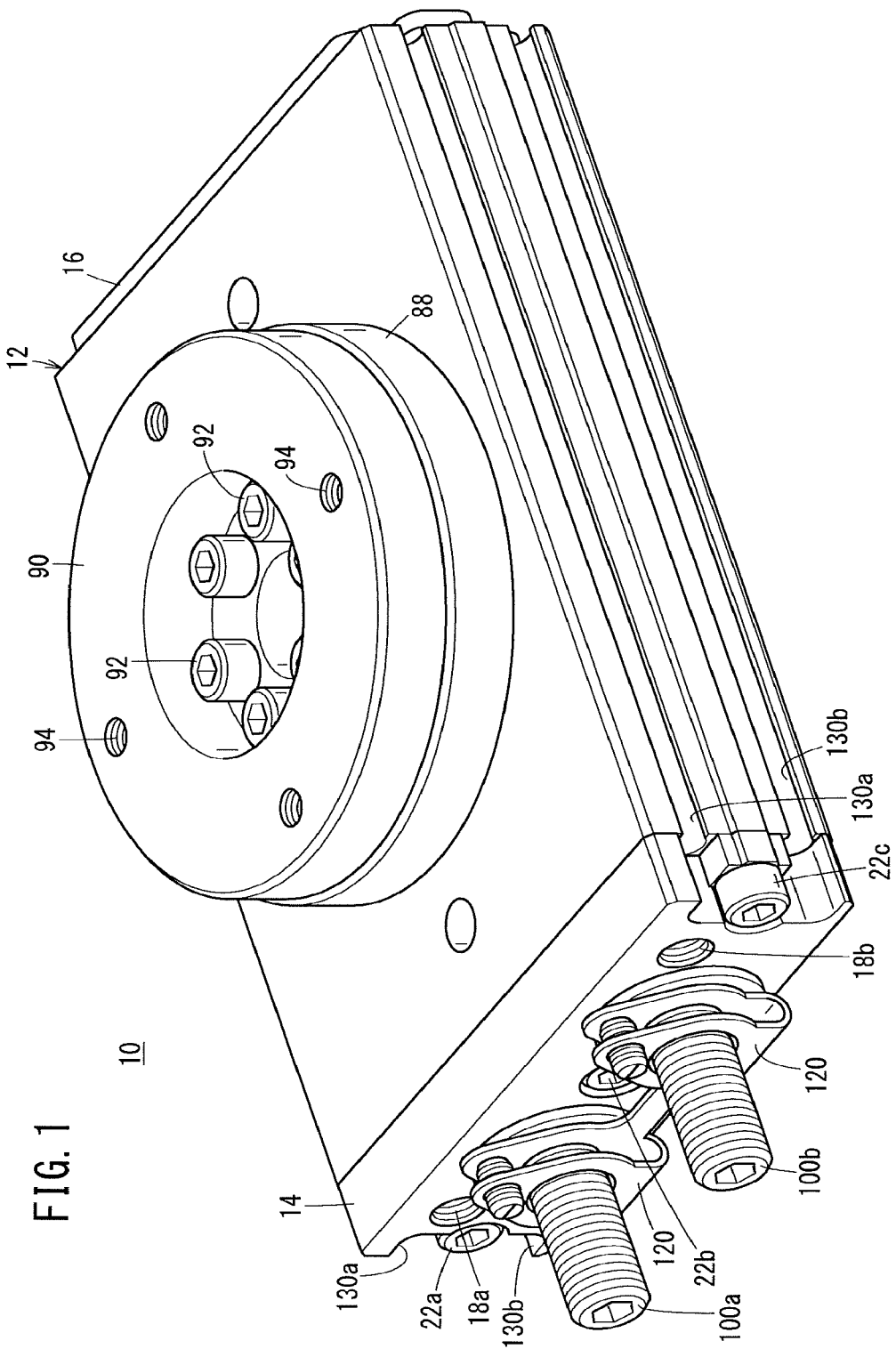
FIG. 1 is an explanatory perspective view of a first embodiment of a rotary actuator.

These components will be more specifically described. In FIG. 1, a reference numeral 10 denotes a rotary actuator according to the first embodiment. This rotary actuator 10 includes a cylinder body 12 that is made of aluminum alloy and is formed in a flat rectangular shape. An opening portion is formed in one end surface perpendicular to a longitudinal direction of the cylinder body 12, and is closed by a first cover 14. An opening portion is formed in another end surface, and is closed by a second cover 16.

Figure 2:
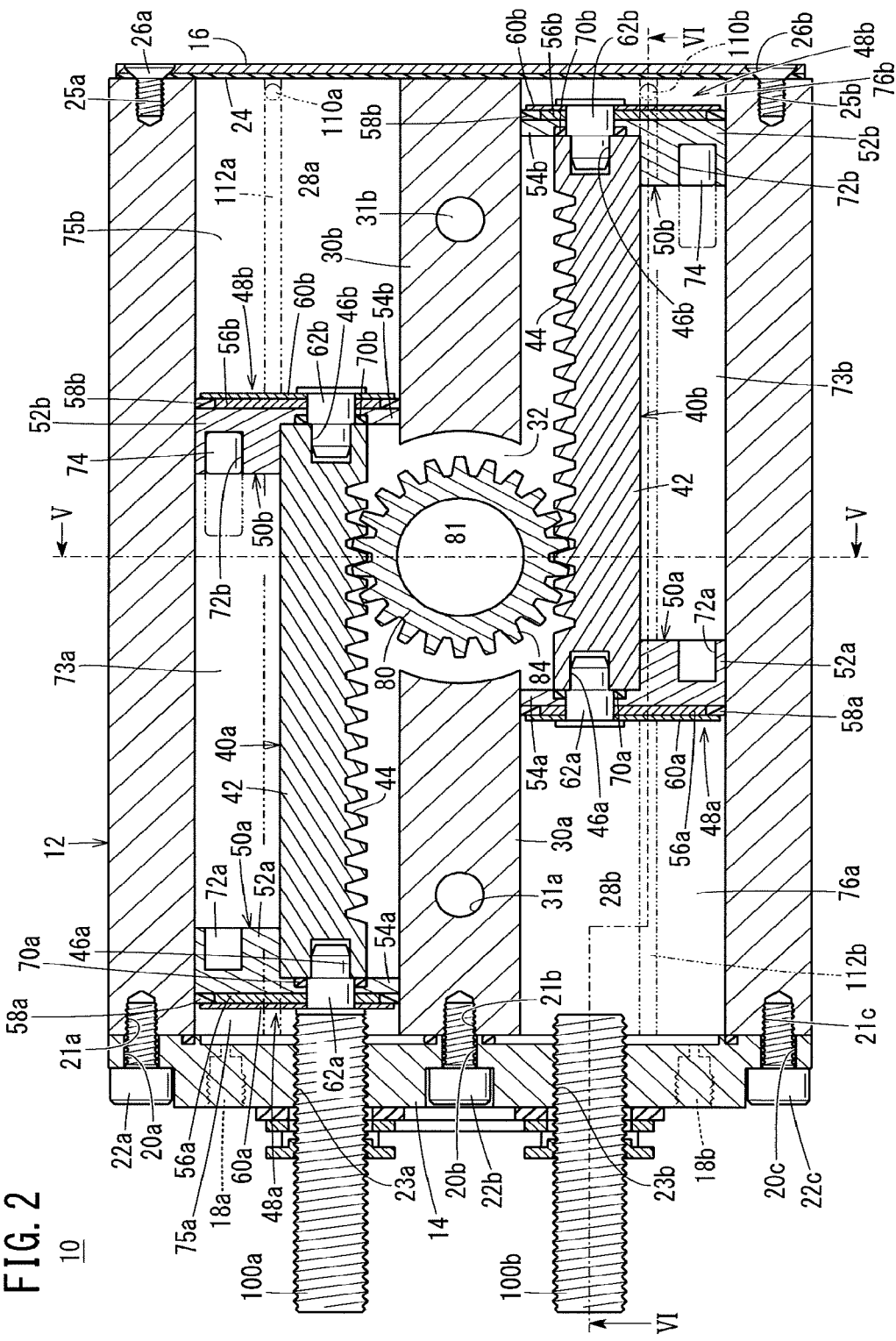
FIG. 2 is an explanatory transverse sectional view of the rotary actuator shown in FIG. 1.

As is easily understood from FIG. 2, the first cover 14 is a relatively thick metal plate body such as a flat plate body made of aluminum, and includes ports 18a, 18b that are formed at a predetermined interval and extend in an axial direction of the cylinder body 12. Through-holes 20a, 20b, 20c at predetermined intervals are formed via step portions such that the ports 18a, 18b are interposed. Fixing screws 22a, 22b, 22c are screwed in the through-holes 20a, 20b, 20c. Distal end portions of the fixing screws 22a, 22b, 22c are screwed in screw holes 21a, 21b, 21c, respectively, formed near the opening portion of the cylinder body 12, to integrate the cylinder body 12 and the first cover 14. Adjustment screw holes 23a, 23b are formed between the port 18a and the through-hole 20b and between the port 18b and the through-hole 20b, respectively, and adjustment screws 100a, 100b described below are screwed in the adjustment screw holes 23a, 23b.

Meanwhile, the second cover 16 is stacked on a gasket 24 and is attached to another end portion of the cylinder body 12. Thus, the opening portion on the other end portion side of the cylinder body 12 is closed. Actually, the gasket 24 and the second cover 16 are fixed airtightly, for example, by screws 26a, 26b screwed in screw holes 25a, 25b formed on the other end side of the cylinder body 12.

Figure 5:
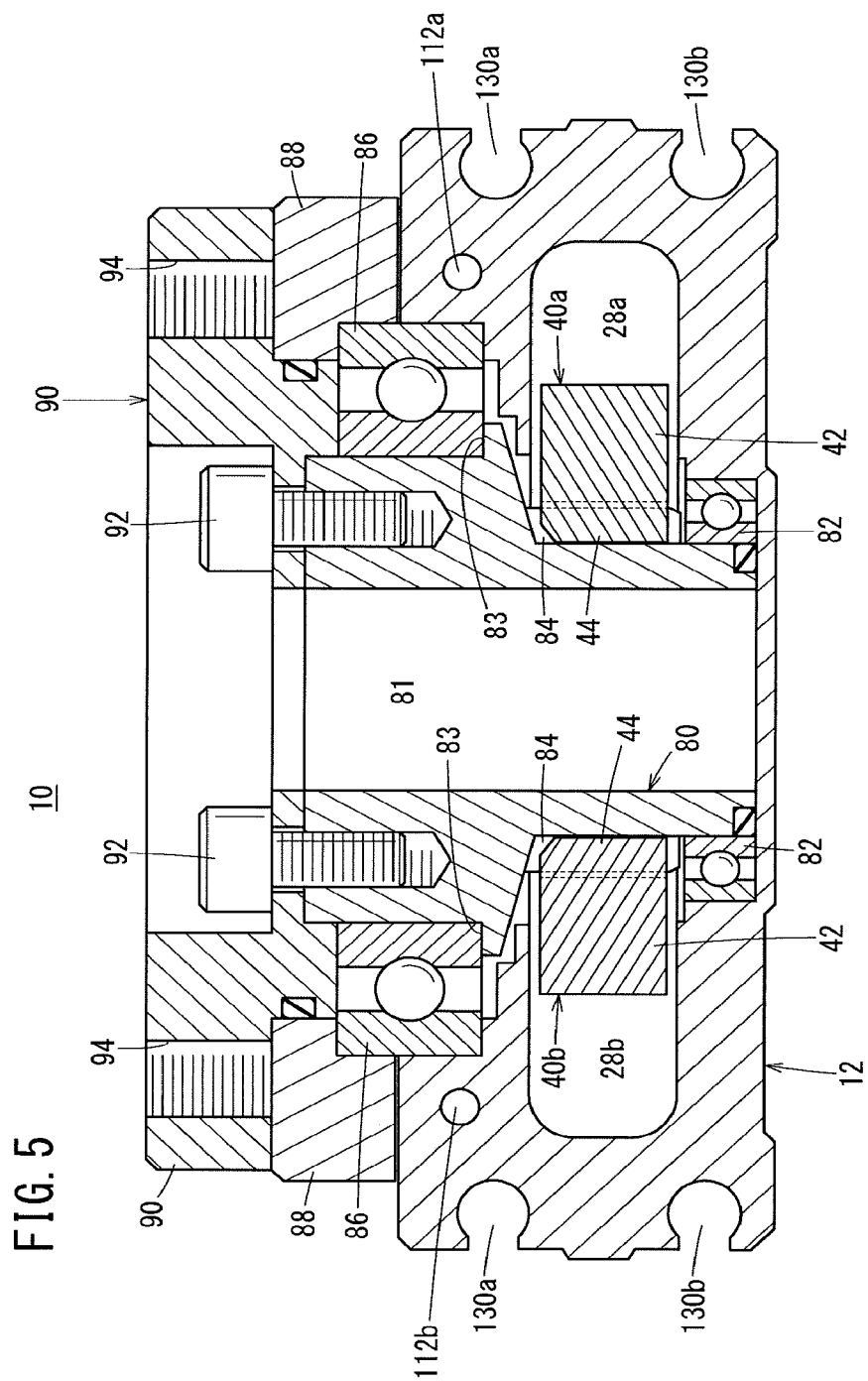
FIG. 5 is a sectional view taken along a line V-V in FIG. 2.

Thus, inside the cylinder body 12 including both end portions in the longitudinal direction closed by the first cover 14 and the second cover 16, a first cylinder hole 28a and a second cylinder hole 28b are formed in substantially parallel, with wall portions 30a, 30b interposed between them. The first cylinder hole 28a and the second cylinder hole 28b have substantially quadrangular sectional shapes as shown in FIG. 5. Such sectional shapes suppress formation of a dead space when the first cylinder hole 28a and the second cylinder hole 28b are formed in the rectangular cylinder body 12. Consequently, it is possible to further miniaturize the rotary actuator 10.

The first wall portion 30a and the second wall portion 30b extend in the same straight line, and are apart at a predetermined interval at a substantially intermediate portion between the first wall portion 30a and the second wall portion 30b. An attachment hole 31a to which the rotary actuator 10 is attached is formed in the first wall portion 30a. An attachment hole 31b is formed in the second wall portion 30b likewise. End portions of the first wall portion 30a and the second wall portion 30b facing toward each other are formed in arc shapes. These two arcs form a space 32 that houses a pinion 80 described below.

As shown in FIG. 5, a passage 112a is formed in a position of the cylinder body 12 deviated toward a table main body 90 described below compared to the first cylinder hole 28a, and penetrates the cylinder body 12 along the axial direction. A passage 112b is formed at a position in the cylinder body 12 deviated toward the table main body 90 compared to the second cylinder hole 28b, and penetrates the cylinder body 12 along the axial direction.

A first linear actuating mechanism 40a is displaceably arranged in the first cylinder hole 28a. A second linear actuating mechanism 40b is displaceably arranged in the second cylinder hole 28b. In this regard, the first linear actuating mechanism 40a and the second linear actuating mechanism 40b are structured as a pair. Therefore, the first linear actuating mechanism 40a will be described in detail below, and a detailed description of the second linear actuating mechanism 40b will be omitted.

Figure 4:
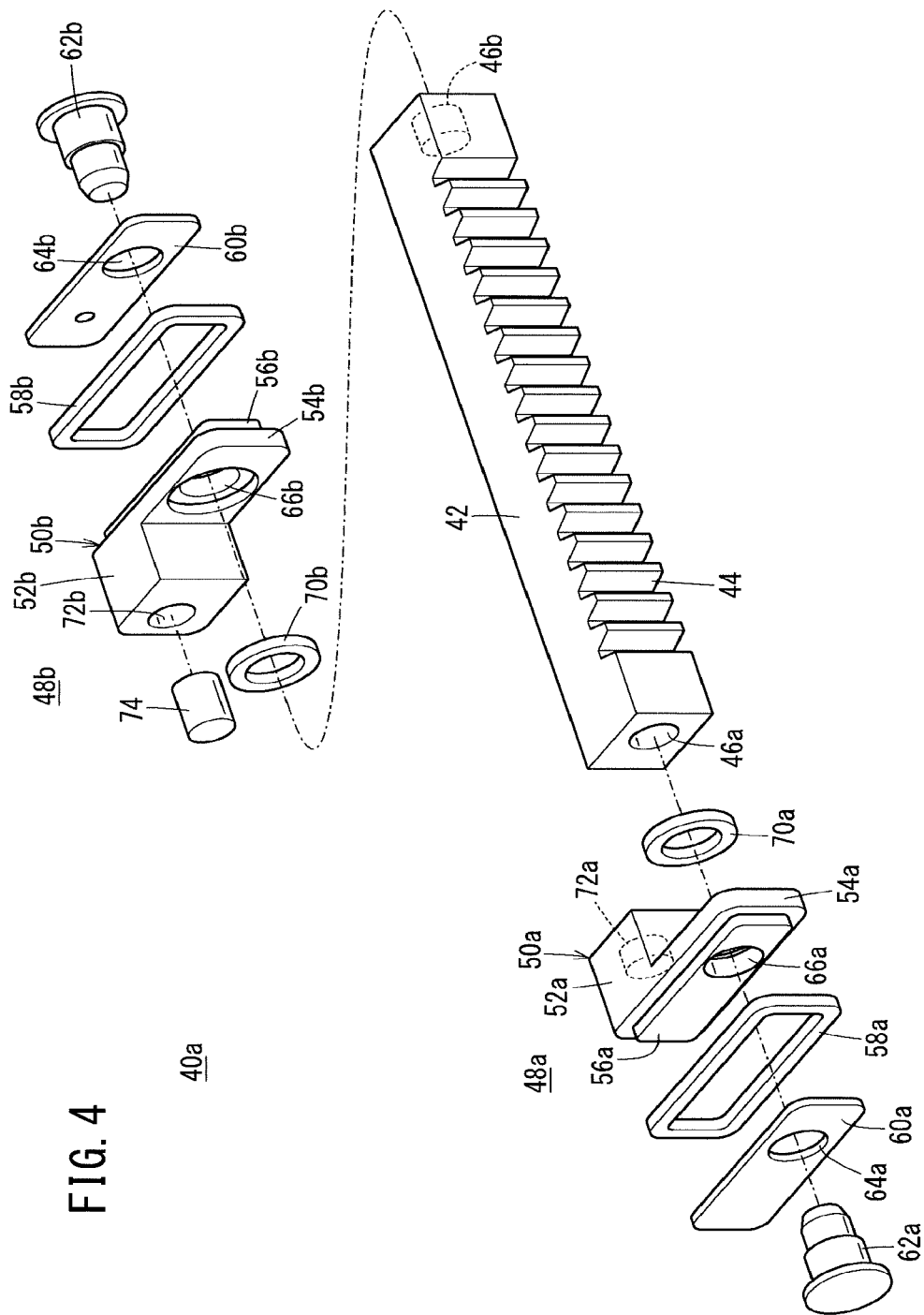
FIG. 4 is an exploded perspective view of a rack and a piston that form the rotary actuator in FIG. 1.

As is easily understood from an exploded perspective view in FIG. 4, the first linear actuating mechanism 40a includes a rack 42. The rack 42 has a substantially square sectional shape as shown in FIG. 5, and a plurality of teeth 44 are continuously formed on one side surface at equal intervals. In this regard, the sectional shape of the rack 42 is not limited to the square shape, and may be selected from a polygonal shape, a circular shape, a semielliptical shape, and the like. The rack 42 is preferably made of iron, yet is not limited to this but it is sufficient if it has good rigidity. Recess portions 46a, 46b formed at both end portions of the rack 42 are used to attach pistons 48a, 48b.

The piston 48a includes a piston main body 50a. As is easily understood from FIG. 4, the piston main body 50a includes a body 52a that is formed by a thick rectangular body, and an extended portion 54a that is thinner than the body 52a. The body 52a and the extended portion 54a are preferably made of integrally molded metal or resin. The body 52a and the extended portion 54a entirely match with the shape of the first cylinder hole 28a, and are disposed such that the extended portion 54a faces toward the first wall portion 30a in the first cylinder hole 28a. That is, the extended portion 54a extends from the body 52a toward the pinion 80 (see FIG. 2), and is disposed deviating toward the pinion 80 compared to a center in a lateral direction of the first cylinder hole 28a. A first plate 56a is fixed to one surface that is smooth from the body 52a to the extended portion 54a, and a hollow and rectangular sealing member 58a is fitted to a step portion formed by fixing this first plate 56a.

A second plate 60a is stacked covering surfaces of the sealing member 58a and the first plate 56a on one side. A fixing pin 62a is inserted via a hole portion 64a formed in this second plate 60a, a hole portion 66a formed in the first plate 56a, a hole portion (not shown) that is formed in the extended portion 54a, and a sealing member 70a of a ring shape. A distal end portion of the fixing pin 62a is fixed to the recess portion 46a of the rack 42 to integrate the piston 48a and the rack 42. Similarly, the piston 48b is fixed to another end side of the rack 42. The piston 48b at the other end side employs the substantially same configuration as the piston 48a. Therefore, a small letter "b" will be added to reference numerals indicating components of the piston 48a and will not be described in detail. These components are fixed to the recess portion 46b via a fixing pin 62b.

As shown in FIG. 4, another piston main body 50b that forms the piston 48b includes a recess portion 72b of a cylindrical columnar shape. In this recess portion 72b, a position detection magnet 74 of a cylindrical columnar shape is inserted. It is a matter of course that a recess portion 72a similar to the recess portion 72b may be formed in the piston main body 50a on one side, and that a magnet of a cylindrical columnar shape that is not shown may be attached to the recess portion 72a.

It is important that the extended portions 54a, 54b of the pistons 48a, 48b are fixed to both end portions of the rack 42 of the first linear actuating mechanism 40a such that the rack 42 is disposed deviating toward the pinion 80 in the first cylinder hole 28a. Consequently, it is possible to form a sufficient space 73a between the bodies 52a, 52b of the pistons 48a, 48b and between a sidewall of the rack 42 and the first cylinder hole 28a. This space 73a can be utilized to attach the long magnet 74 indicated by a broken line in FIG. 2 as necessary in accordance with the use desired by a user. The same applies to the second linear actuating mechanism 40b. Depending on cases, this space 73a may be used to attach other members such as a wear ring and an absorber (neither shown) to the rack 42 and the pistons 48a, 48b.

Figure 6:
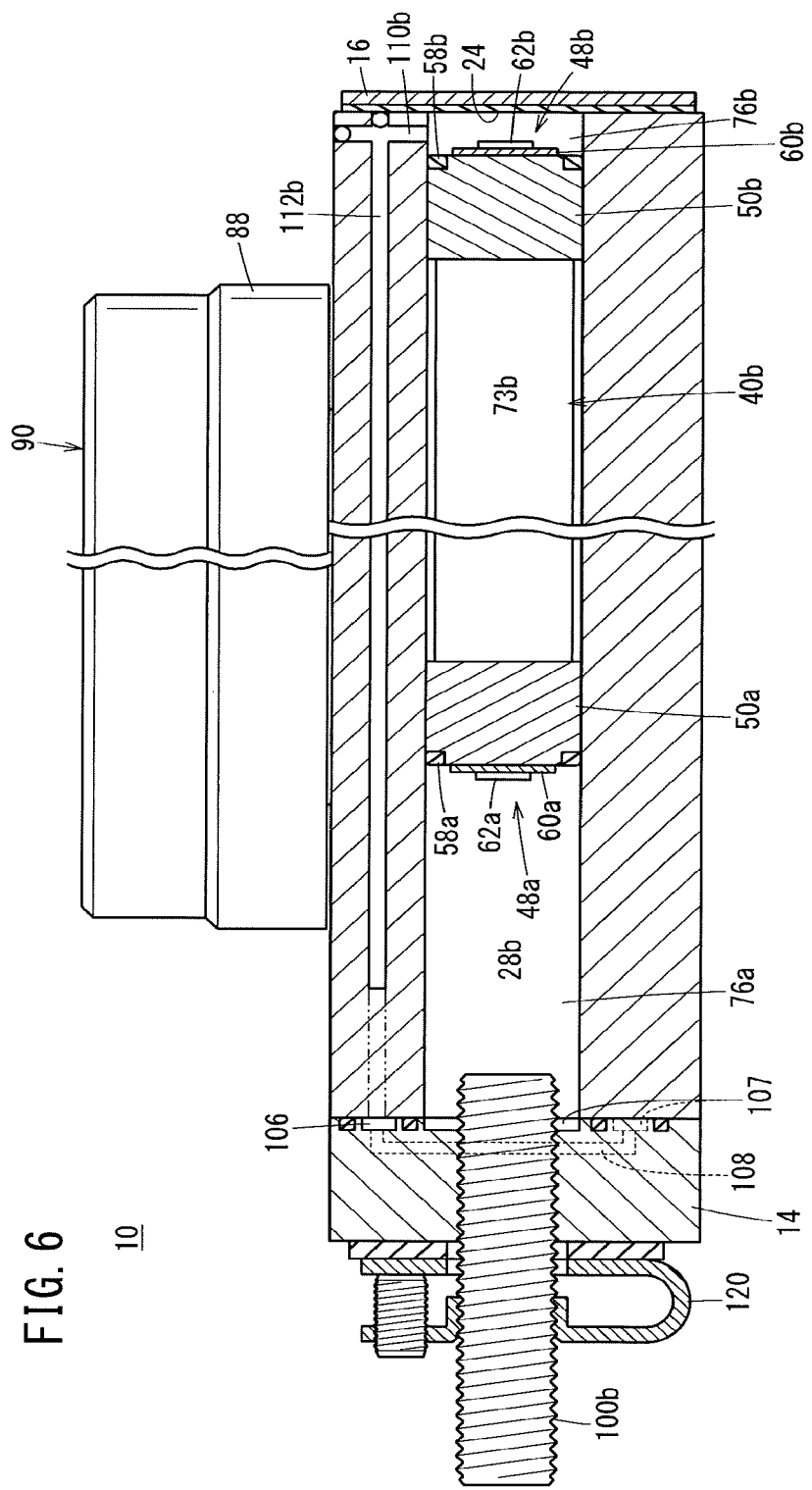
FIG. 6 is a sectional view taken along a line VI-VI in FIG. 2.

The first cylinder hole 28a is partitioned into the space 73a, a first cylinder chamber 75a and a second cylinder chamber 75b by the pistons 48a, 48b. That is, the first cover 14 and the piston 48a form the first cylinder chamber 75a. The piston 48b and the second cover 16 (gasket 24) form the second cylinder chamber 75b. Similarly, as shown in FIG. 6, the second cylinder hole 28b is partitioned into a third cylinder chamber 76a, a space 73b and a fourth cylinder chamber 76b formed between the first cover 14 and the piston 48a, between the pistons 48a, 48b and between the piston 48b and the second cover 16, respectively.

Next, the pinion 80 that performs the rotating operation under biasing actions of the first and second linear actuating mechanisms 40a, 40b will be described. The pinion 80 is disposed in the circular space 32 formed between the first wall portion 30a and the second wall portion 30b. The pinion 80 has a cylindrical shape whose center portion along the axial direction includes a space 81, as shown in FIG. 5. A first bearing 82 of a relatively small diameter is arranged between a lower portion of the pinion 80 and the cylinder body 12. The pinion 80 includes a plurality of teeth 84 that are engraved at equal intervals on an outer circumferential surface, above portions that sandwich the first bearing 82. These teeth 84 enmesh with the teeth 44 of the racks 42.

A step portion 83 is formed at an upper portion of the pinion 80, and this step portion 83 is used to arrange a second bearing 86 of a larger diameter than that of the first bearing 82, between the pinion 80 and the cylinder body 12. A ring body 88 including a step fits to an outer circumferential surface of the second bearing 86. As shown in FIG. 1, the table main body 90 of an annular shape is fixed to the upper portion of the pinion 80 via a plurality of bolts 92. In the table main body 90, a plurality of attachment holes 94 are formed at equal intervals outside the bolts 92, and a workpiece that is not shown is attached by using the bolts. According to the above configuration, it is easily understood that the table main body 90 integrally formed with the pinion 80 by the bolts 92 is rotated under action of the bearings 82, 86 by rotation of the pinion 80.

The adjustment screws 100a, 100b will be described hereinafter, which restrict a stroke of the rack 42, i.e., displacement ranges of the first linear actuating mechanism 40a and the second linear actuating mechanism 40b that perform a reciprocating operation inside the first cylinder hole 28a and the second cylinder hole 28b.

A distal end portion of the adjustment screw 100a that is relatively long and includes a screw portion formed at an outer circumference portion is screwed to the adjustment screw hole 23a formed in the first cover 14. This distal end portion faces toward a head portion of the fixing pin 62a of the first linear actuating mechanism 40a. Hence, depending on how deep the adjustment screw 100a is screwed to the adjustment screw hole 23a, a position abutted by a head portion of the fixing pin 62a is restricted. Consequently, the stroke of the first linear actuating mechanism 40a, i.e., the stroke of the rack 42 is adjusted. The adjustment screw 100b that restricts an actuating range of the rack 42 of the second linear actuating mechanism 40b also employs the same configuration as the adjustment screw 100a, and therefore will not be described in detail.

As shown in FIG. 1, screwing positions of the adjustment screws 100a, 100b are positioned securely by metal fittings 120 that have good elastic forces and whose transverse sectional shapes are formed by being curved in U shapes.

Figure 3:
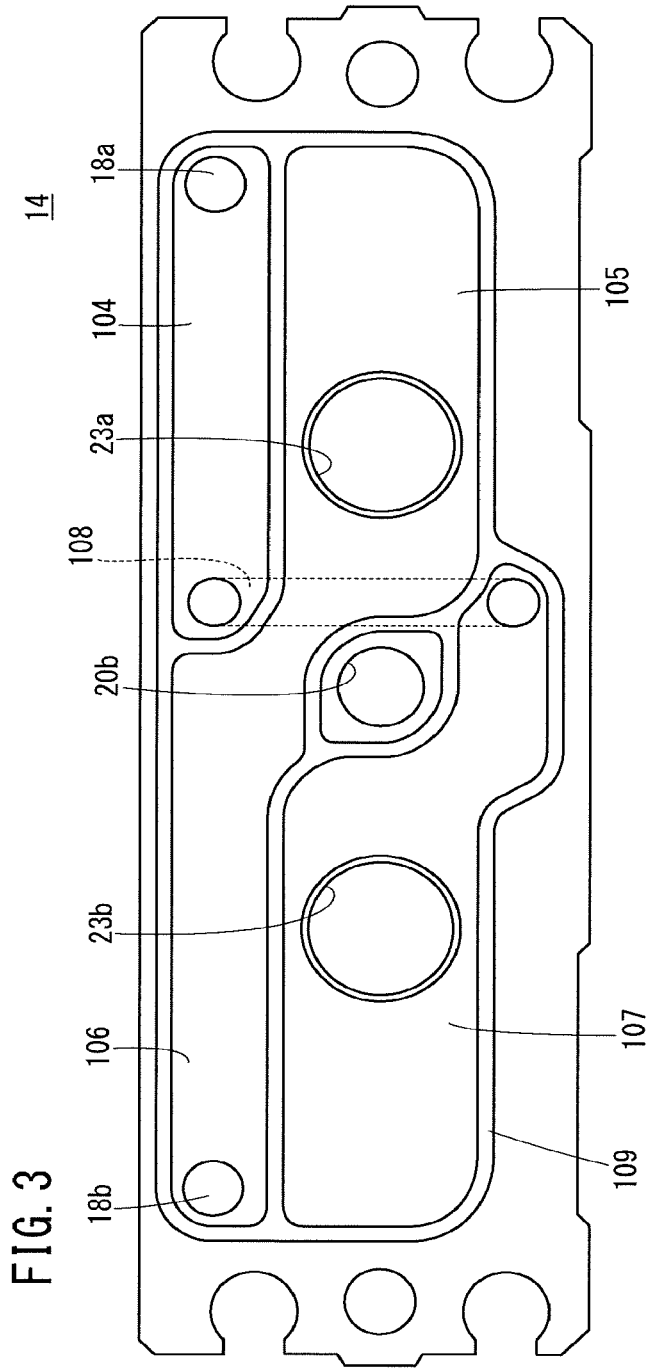
FIG. 3 is a schematic side view of a first cover.

Next, a flow path will be described, which is used to supply and discharge a pressure fluid to and from the rotary actuator 10 configured as described above. As shown in FIG. 3, a first recess portion 104, a second recess portion 105, a third recess portion 106 and a fourth recess portion 107 are formed in a surface of the first cover 14 facing toward the opening portion of the cylinder body 12, and recessed compared to this surface.

The first recess portion 104 communicates with the port 18a, and faces toward an opening portion of the passage 112a (see FIG. 2). The second recess portion 105 faces toward the first cylinder chamber 75a (see FIG. 2), and communicates with the third recess portion 106 on a center side in a width direction of the first cover 14. The third recess portion 106 communicates with the port 18b, and faces toward an opening portion of the passage 112b (see FIGS. 2 and 6). The fourth recess portion 107 faces toward the third cylinder chamber 76a (see FIGS. 2 and 6).

A communication path 108 is formed inside the first cover 14 for communication between the first recess portion 104 and the fourth recess portion 107. That is, the first cover 14 enables the fluid to freely flow between the first recess portion 104 and the fourth recess portion 107, and enables a fluid to freely flow between the second recess portion 105 and the third recess portion 106.

A gasket 109 is interposed between the first cover 14 and the cylinder body 12, and is integrally arranged along outlines (outer shapes) of the first recess portion 104, the second recess portion 105, the third recess portion 106, and the fourth recess portion 107.

As shown in FIGS. 2 and 3, the cylinder body 12 includes a supplying/discharging port 110a that communicates with the second cylinder chamber 75b. This supplying/discharging port 110a communicates with the first recess portion 104 via the passage 112a. The cylinder body 12 includes a supplying/discharging port 110b that communicates with the fourth cylinder chamber 76b. This supplying/discharging port 110b communicates with the third recess portion 106 via the passage 112b.

In the drawings, reference numerals 130a, 130b denote sensor grooves arranged in side surfaces in the longitudinal direction of the cylinder body 12. Proximity switches that are not shown are inserted and fixed in these sensor grooves 130a, 130b to detect displacement of the racks 42, i.e., positions of the racks 42 by receiving the magnetic field lines of the magnets 74 attached to the recess portions 72a, 72b of the piston main bodies 50a, 50b.

The rotary actuator 10 according to the first embodiment is basically configured as described above. Next, a function and an effect of the rotary actuator 10 will be described.

Tubes for supplying and discharging a pressure fluid such as compressed air are connected to the ports 18a, 18b via connectors that are not shown. Meanwhile, the attachment holes 94 formed in the table main body 90 are used to fix a workpiece that is not shown by the bolts. Hence, when the compressed air is supplied from the port 18b in an initial state shown in FIG. 2, part of the compressed air flows to the second recess portion 105 via the third recess portion 106, and is introduced in the first cylinder chamber 75a. Thus, one end side, i.e., the piston main body 50a of the first linear actuating mechanism 40a on a side of the first cover 14, more specifically, the head portion of the fixing pin 62a, the second plate 60a, a surface of the sealing member 58a, and the like become pressure receiving portions, and press the rack 42 toward the other end, i.e., toward the second cover 16.

The rest of the compressed air supplied from the port 18b is introduced from the third recess portion 106 into the fourth cylinder chamber 76b via the passage 112b and the supplying/discharging port 110b. Thus, the piston main body 50b of the second linear actuating mechanism 40b on a side of the second cover 16 becomes a pressure receiving portion, and presses the rack 42 toward the other end, i.e., toward the first cover 14.

As described above, when the rack 42 of the first linear actuating mechanism 40a is displaced toward the second cover 16 as described above, air in the second cylinder chamber 75b is compressed, and flows from the supplying/discharging port 110a to the first recess portion 104 via the passage 112a. Simultaneously, when the rack 42 of the second linear actuating mechanism 40b is displaced toward the first cover 14, air in the third cylinder chamber 76a is compressed, and flows from the fourth recess portion 107 to the first recess portion 104 via the communication path 108. This air having flown to the first recess portion 104 is discharged from the port 18a to the tube that is not shown.

Thus, the pinion 80 that enmeshes with the teeth 44 of the racks 42 is rotated in a clockwise direction in FIG. 2. Positions of the pistons 48a, 48b are detected by the unillustrated proximity switches that are biased by the magnetic field lines produced by the magnets 74.

Next, when an unillustrated switching valve is switched and the compressed air is supplied from the port 18a, the part of the compressed air flows from the first recess portion 104 to the fourth recess portion 107 via the communication path 108, and is introduced in the third cylinder chamber 76a. Thus, the piston main body 50a of the second linear actuating mechanism 40b on the side of the first cover 14 becomes a pressure receiving portion, and presses the rack 42 toward the second cover 16.

The rest of the compressed air supplied from the port 18a is introduced in the second cylinder chamber 75b via the first recess portion 104, the passage 112a and the supplying/discharging port 110a. Thus, the piston main body 50b of the first linear actuating mechanism 40a on the side of the second cover 16 becomes a pressure receiving portion, and presses the rack 42 toward the first cover 14.

When the rack 42 of the second linear actuating mechanism 40b is displaced toward the second cover 16 as described above, air in the fourth cylinder chamber 76b is compressed, and flows from the supplying/discharging port 110b to the third recess portion 106 via the passage 112b. Simultaneously, when the rack 42 of the first linear actuating mechanism 40a is displaced toward the first cover 14, air in the first cylinder chamber 75a is compressed, and flows from the second recess portion 105 to the third recess portion 106. The air having flown in the third recess portion 106 is discharged from the port 18b to the tube that is not shown.

Thus, the pinion 80 that enmeshes with the teeth 44 of the racks 42 rotates in a counterclockwise direction in FIG. 2. The result is a state shown in FIG. 2.

These operations are alternately repeated between the first linear actuating mechanism 40a and the second linear actuating mechanism 40b to rotate the pinion 80 forward or backward, so that the table main body 90 also rotates forward or backward as a result. That is, rotation of the table main body 90 coupled to the pinion 80 via the bolts 92 rotates the workpiece attached to the table main body 90, so that it is possible to machine the workpiece, for example.

According to the rotary actuator 10 according to the first embodiment, in the first linear actuating mechanism 40a and the second linear actuating mechanism 40b, the pistons 48a, 48b that form a pair are fixed to both end portions of the rack 42. The body 52a that forms the piston 48a is formed by a relatively thick rectangular body. The thin extended portion 54a is formed sideward (a horizontal direction in the drawings) from this body 52a. The end portion of the rack 42 is fixated to the step portion formed between the body 52a and the extended portion 54a. The piston 48b also employs the same configuration. Hence, a fluid pressure applied to the bodies 52a, 52b and the extended portions 54a, 54b is received with sufficient strength. Further, the space 73a is formed between the piston main bodies 50a, 50b. This space 73a can be used for various applications such as attachment of the long magnets 74, arrangement of a wear ring, and so on. Further, there is also an advantage that the rotary actuator 10 can be designed to be thin.

That is, even when the rotary actuator 10 is miniaturized, it is possible to effectively utilize the space between the piston main body 50a and the piston main body 50b, and secure the degree of freedom to attach the magnets 74. Also, the bodies 52a, 52b and the extended portions 54a, 54b can secure a sufficient pressure receiving area. Consequently, it is possible to provide an effect of sufficiently securing a necessary thrust for a displacing operation of the racks 42. Particularly, the first cylinder hole 28a and the second cylinder hole 28b have the quadrangular sectional shapes. Consequently, it is possible to form the cylinder body 12 in a more flat shape and keep a low height of the rotary actuator 10.

Next, a second embodiment of the rotary actuator according to the present invention will be described below with reference to FIG. 7. In this regard, the same reference numerals as the reference numerals assigned to the components used in the first embodiment indicate the same components, and will not be described in detail. A rotary actuator 200 according to the second embodiment differs from the rotary actuator 10 according to the first embodiment in that one linear actuating mechanism 220 is provided inside a cylinder body 202.

In the rotary actuator 200, an opening portion formed in one end surface perpendicular to the longitudinal direction of the thick cylinder body 202 is closed by a first cover 206. An opening portion formed in another end surface is closed by a second cover 208.

The first cover 206 is made of a relatively thick metal plate body, and includes the port 18a on one thick side surface. The second cover 208 is the same plate body as the first cover 206, and includes the port 18b.

A cylinder hole 210 is formed inside the cylinder body 202 closed by the first cover 206 and the second cover 208. A recess portion 212 of an arc shape is formed in one thick wall portion 214 of the cylinder body 202, and houses the pinion 80. As is easily understood from FIG. 7, the pinion 80 is pivotally supported rotatably in a space formed by the cylinder hole 210 and the recess portion 212.

The linear actuating mechanism 220 is displaceably arranged in the cylinder hole 210. A piston main body 222a has the substantially same shape as a transverse sectional space of the cylinder hole 210. According to the above configuration, an illustrated proximity switch is arranged in a thin wall portion 216 that is opposite to the thick wall portion 214 in which the recess portion 212 of the cylinder body 202 is foil led, and the proximity switch detects a position of a piston main body 222b.

The rotary actuator 200 according to the second embodiment is basically configured as described above. Next, a function and an effect of the rotary actuator 200 will be described.

Tubes for supplying and discharging a pressure fluid such as compressed air are connected to the ports 18a, 18b via the connectors that are not shown. When the compressed air is supplied from the port 18a, the piston main body 222a on a side of the first cover 206 becomes a pressure receiving portion, and presses the rack 42 toward the second cover 208. As a result, the rack 42 is displaced toward the second cover 208, and air in the cylinder chamber between the piston main body 222b and the second cover 208 is compressed, and is discharged from the port 18b to a tube that is not shown.

Figure 7:
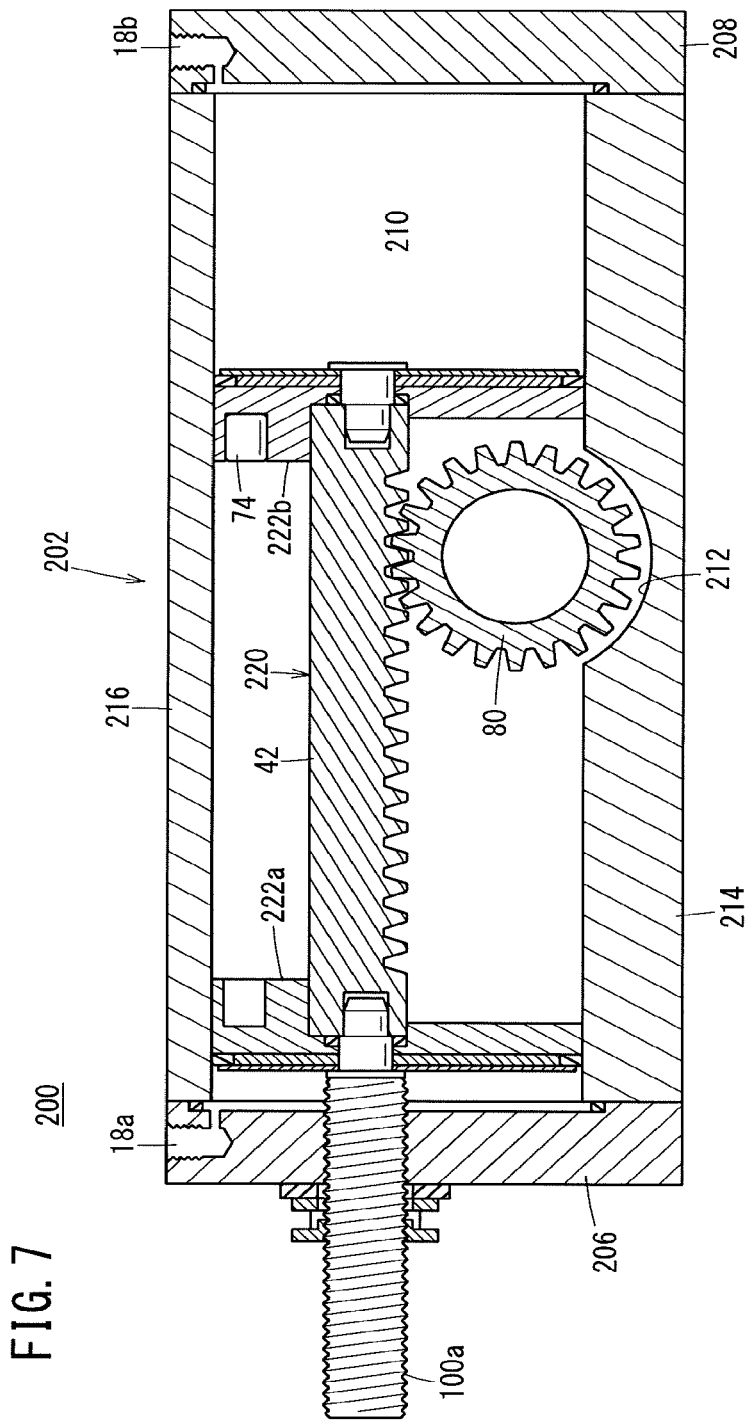
FIG. 7 is an explanatory transverse sectional view of a second embodiment of the rotary actuator.

During the displacement, the pinion 80 that enmeshes with the teeth 44 of the rack 42 rotates in the clockwise direction in FIG. 7. As a result, an end position of the piston main body 222b on a side of the second cover 208 is detected by the unillustrated proximity switch that is actuated when receiving the magnetic field lines of the magnets 74. Next, when the unillustrated switching valve is switched and the compressed air is introduced from the port 18b, the piston main body 222b of the linear actuating mechanism 220 is pushed by this compressed air and is displaced toward the first cover 206, and exhaust air is discharged from the port 18a to the outside. Such an operation is repeated to rotate an unillustrated table that is coupled to the pinion 80, so that it is possible to machine a workpiece attached to this table.

Similar to the rotary actuator 10 according to the first embodiment, the rotary actuator 200 according to the second embodiment can include the relatively large space between the piston main bodies 222a, 222b, and can provide the same effect as that of the first embodiment.

According to the second embodiment in particular, one of the two linear actuating mechanisms in the first embodiment can be omitted. That is, it is possible to provide an effect that the rotary actuator 200 can be further miniaturized and installed in a narrower space, in particular.

In this regard, the present invention is not necessarily limited to the above embodiments, and can be variously modified without departing from the gist of the present invention.

For example, in the above embodiments, the distal end portions of the adjustment screws 100a, 100b are screwed from the adjustment screw holes 23a, 23b formed in the first cover 14 to the first cylinder hole 28a and the second cylinder hole 28b, respectively. However, the adjustment screw 100a may be entirely housed in the first cylinder hole 28a, and the distal end portion of the adjustment screw 100a may protrude from the space 73a toward at least one of the first cylinder chamber 75a and the second cylinder chamber 75b.

When, for example, the distal end portion of the adjustment screw 100a protrudes toward the first cylinder chamber 75a, a screw hole may be formed in the body 52a of the piston 48a to screw the adjustment screw 100a in the screw hole. Consequently, it is possible to integrally fix the piston 48a and the adjustment screw 100a, and restrict an abutting position of the distal end portion of the adjustment screw 100a and the first cover 14 depending on how deep the adjustment screw 100a is screwed. As a result, the stroke of the first linear actuating mechanism 40a, i.e., the stroke of the rack 42 is adjusted.

When the distal end portion of the adjustment screw 100a protrudes toward the second cylinder chamber 75b, the adjustment screw 100a may be screwed to the body 52b of the piston 48b similar to the above. Consequently, it is possible to restrict an abutting position of the distal end portion of the adjustment screw 100a and the second cover 16, and adjust the stroke of the rack 42. The adjustment screw 100b can also be disposed in the second cylinder hole 28b similar to the adjustment screw 100a.

As described above, since this rotary actuator can include the adjustment screws 100a, 100b by using the space 73a, the rotary actuator can be more effectively miniaturized in the longitudinal direction of the cylinder body 12 as well.

The invention claimed is:

1. A rotary actuator comprising:
a linear actuating mechanism configured to cause a pinion to perform a rotating operation; and
a cylinder body in which a cylinder hole is formed, the linear actuating mechanism being arranged therein for displacement in a direction of a length of the cylinder hole,
wherein the linear actuating mechanism includes:
a rack having a length extending in the direction of displacement of the linear actuating mechanism, the rack including a plurality of teeth configured to enmesh with the pinion; and
a piston coupled to each of opposing end portions of the rack in the direction of displacement,
each piston including
a piston main body having a shape corresponding to the cylinder hole, and
a sealing member attached to the piston main body, and the piston main body including
a body, and
an extended portion extending from the body toward the pinion in a direction transverse to the direction of displacement and being thinner than the body in the direction of displacement, and
wherein the rack is coupled to the respective extended portions such that the rack is provided eccentrically toward the pinion relative to a center of the cylinder hole, in the direction transverse to the direction of displacement, and
wherein an isolated space is formed between the bodies of the respective pistons coupled to each of the opposing end portions of the rack deviated toward the pinion, the isolated space being at a side of the rack opposite the pinion.

2. The rotary actuator according to claim 1, wherein:
second cylinder hole is formed in parallel with the cylinder hole in the cylinder body; and
second linear actuating mechanism is disposed in the second cylinder hole.

3. The rotary actuator according to claim 2, comprising:
a first cover that closes a first opening portion formed at one end of the cylinder body in the direction of the length; and
a second cover that closes a second opening portion formed at another end of the cylinder body in the direction of the length,
wherein
a first recess portion, a second recess portion, a third recess portion, and a fourth recess portion that are recessed in the direction opposite to the first opening portion are formed on a surface of the first cover that faces toward the first opening portion,
the first recess portion communicates with a first port that penetrates the first cover in the direction of the length,
the second recess portion faces toward the cylinder hole and communicates with the third recess portion on a center side in a width direction of the first cover,
the third recess portion communicates with a second port that penetrates the first cover in the direction of the length,
the fourth recess portion faces toward the second cylinder hole, and
a communication path is formed inside the first cover for communication between the first recess portion and the fourth recess portion.

4. The rotary actuator according to claim 1, wherein each piston main body is formed by integrally molding the respective body and extended portion.

5. The rotary actuator according to claim 1, wherein the body of at least one of the respective pistons includes a magnet disposed at an end portion facing toward the space.

6. The rotary actuator according to claim 1, wherein:
the cylinder body has a substantially quadrangular outer shape; and
the cylinder hole has a substantially quadrangular transverse sectional shape.

7. The rotary actuator according to claim 1,
wherein end portions of the isolated space in the direction of displacement are disposed more toward a center in the direction of displacement than are end portions of the rack in the direction of displacement.

* * * * *